US005459995A

United States Patent [19]

Norton et al.

[11] Patent Number: 5,459,995

[45] Date of Patent: Oct. 24, 1995

[54] TURBINE NOZZLE ATTACHMENT SYSTEM

[75] Inventors: Paul F. Norton, San Diego, Calif.; James E. Shaffer, Maitland, Fla.

[73] Assignee: Solar Turbines Incorporated, San Diego, Calif.

[21] Appl. No.: 265,863

[22] Filed: Jun. 27, 1994

[51] Int. Cl.[6] .......... F02C 7/00

[52] U.S. Cl. .......... 60/39.31; 60/39.32; 60/753

[58] Field of Search .......... 60/39.31, 39.32, 60/39.75, 752, 753; 415/209.2, 209.3, 210.1, 241 B

[56] References Cited

U.S. PATENT DOCUMENTS

| | | | |
|---|---|---|---|
| 2,445,661 | 7/1948 | Constant et al. | 60/39.32 |
| 4,260,327 | 4/1981 | Armor et al. | 415/200 |
| 4,391,565 | 7/1983 | Speak | 415/189 |
| 4,485,630 | 12/1984 | Kenworthy | 60/39.32 |
| 4,768,924 | 9/1988 | Carrier et al. | 415/189 |
| 5,211,536 | 5/1993 | Ackerman et al. | 415/209.3 |
| 5,224,822 | 7/1993 | Lenahan et al. | 415/209.3 |
| 5,289,677 | 3/1994 | Jarrell | 60/39.32 |
| 5,363,643 | 11/1994 | Halila | 60/39.31 |
| 5,380,154 | 1/1995 | Norton et al. | 415/209.2 |
| 5,392,596 | 2/1995 | Holsapple et al. | 60/39.32 |

*Primary Examiner*—Timothy S. Thorpe
*Attorney, Agent, or Firm*—Larry G. Cain

[57] ABSTRACT

A nozzle guide vane assembly having a preestablished rate of thermal expansion is positioned in a gas turbine engine and being attached to conventional metallic components. The nozzle guide vane assembly includes a pair of legs extending radially outwardly from an outer shroud and a pair of mounting legs extending radially inwardly from an inner shroud. Each of the pair of legs and mounting legs have a pair of holes therein. A plurality of members attached to the gas turbine engine have a plurality of bores therein which axially align with corresponding ones of the pair of holes in the legs. A plurality of pins are positioned within the corresponding holes and bores radially positioning the nozzle guide vane assembly about a central axis of the gas turbine engine.

12 Claims, 3 Drawing Sheets

TURBINE NOZZLE ATTACHMENT SYSTEM

BACKGROUND ART

"The Government of the United States of America has rights in this invention pursuant to Contract No. DE-AC02-92CE40960 awarded by the U.S. Department of Energy."

TECHNICAL FIELD

This invention relates generally to a gas turbine engine and more particularly to a system for attaching the nozzle to the gas turbine engine.

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a nozzle which directs the hot gas to a turbine, delivering up some of its energy to drive the turbine and produce mechanical power.

In order to increase efficiency, the nozzle has a preestablished aerodynamic contour. The axial turbine consists of one or more stages, each employing one row of stationary nozzle guide vanes and one row of moving blades mounted on a turbine disc. The aerodynamically designed nozzle guide vanes direct the gas against the turbine blades producing a driving torque and thereby transferring kinetic energy to the blades.

The gas typically entering through the nozzle is directed to the turbine at an entry temperature from 850 degrees to at least 1200 degrees Fahrenheit. Since the efficiency and work output of the turbine engine are related to the entry temperature of the incoming gases, there is a trend in gas turbine engine technology to increase the gas temperature. A consequence of this is that the materials of which the nozzle vanes and blades are made assume ever-increasing importance with a view to resisting the effects of elevated temperature.

Historically, nozzle guide vanes and blades have been made of metals such as high temperature steels and, more recently, nickel alloys, and it has been found necessary to provide internal cooling passages in order to prevent melting. It has been found that ceramic coatings can enhance the heat resistance of nozzle guide vanes and blades. In specialized applications, nozzle guide vanes and blades are being made entirely of ceramic, thus, imparting resistance to even higher gas entry temperatures.

Ceramic materials are superior to metal in high-temperature strength, and have properties of low fracture toughness, low linear thermal expansion coefficient and high elastic coefficient.

When a ceramic structure is used to replace a metallic part or is combined with a metallic one, it is necessary to avoid excessive thermal stresses generated by uneven temperature distribution or the difference between their linear thermal expansion coefficients. The ceramic's different chemical composition, physical properties and coefficient of thermal expansion to that of a metallic supporting structure result in undesirable stresses, a large portion of which is thermal stress, which will be set up within the nozzle guide vanes and/or blades and between the nozzle guide vanes and/or blades and their supports when the engine is operating.

Furthermore, conventional nozzle and blade designs which are made from a metallic material can be capable of absorbing or resisting these thermal stresses. The chemical composition of ceramic nozzles and blades do not have the characteristics to absorb or resist high thermal stresses, which are tensile in nature.

The present invention is directed to overcome one or more of the problems as set forth above.

DISCLOSURE OF THE INVENTION

In one aspect of the invention, a system for attaching a nozzle guide vane assembly to a gas turbine engine having a central axis, a combustor and a turbine assembly positioned therein is disclosed. The system positions the nozzle guide vane assembly in radially spaced relationship to the central axis and axially spaced relationship to the combustor and the turbine assembly. The system for attaching is comprised of a plurality of members attached to the gas turbine engine. Each of the plurality of members has a plurality of bores therein being radially spaced about the central axis. An outer shroud defines an outer surface and has a pair of legs extending radially outwardly therefrom. Each of the pair of legs has a pair of holes therein being axially aligned with the corresponding pair of holes in the other of the pair of legs and the bores in the plurality of members. An inner shroud defines an inner surface and has a pair of mounting legs extending radially inwardly therefrom. Each of the pair of mounting legs has a pair of holes therein being axially aligned with the corresponding pair of holes in the other of the pair of mounting legs and the bores in the plurality of members. A plurality of pins are positioned in the plurality of bores, the pair of holes in the outer shroud and the pair of holes in the inner shroud. Means for retaining the pins from axial movement is further included.

BEST MODE FOR CARRYING OUT THE INVENTION

Figure 1:
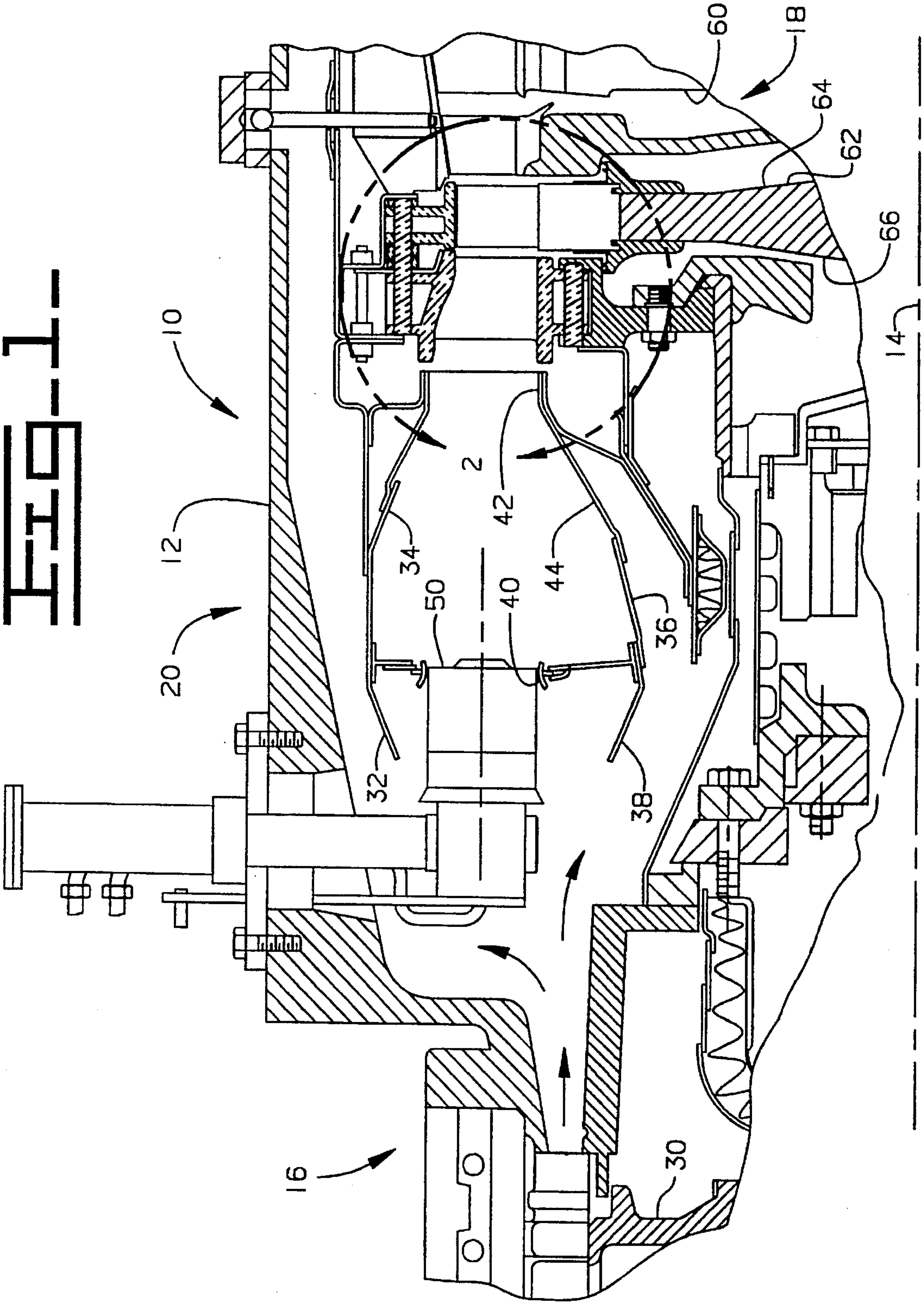
FIG. 1 is a partial side view of a gas turbine engine embodying the present invention with portions shown in section for illustration convenience.
Figure 2:
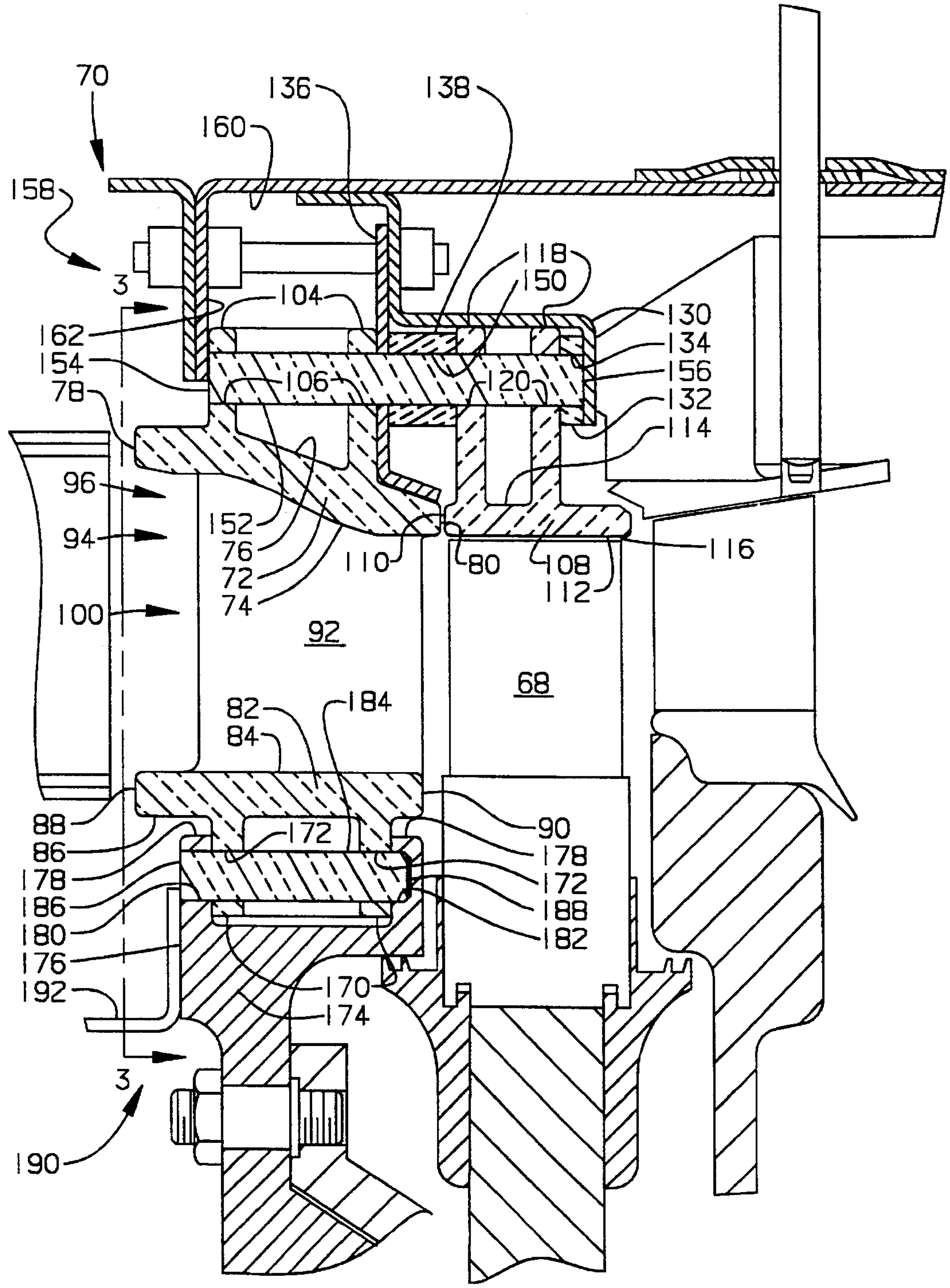
FIG. 2 is an enlarged sectional view of a portion of the gas turbine engine having a nozzle guide vane assembly as taken within line 2 of FIG. 1.

Referring to FIG. 1, a gas turbine engine 10 is shown. The gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 30 or, as an alternative, a radial compressor or any source for producing compressed air, causes a flow of compressed air which has at least a part thereof communicated to the combustor section 20 and another portion used for cooling components of the gas turbine engine 10. The combustor section 20, in this application, includes an annular combustor 32. The combustor 32 has a generally cylindrical outer shell 34 being coaxially positioned about the central axis 14, a generally cylindrical inner shell 36, an inlet end 38 having a plurality of generally evenly spaced openings 40 therein and an outlet end 42. In this application, the combustor 32 is constructed of a plurality of generally conical segments 44. Each of the openings 40 has an injector 50 positioned therein. As an alternative to the annular combustor 32, a plurality of can type combustors could be incorporated without changing the essence of the invention.

The turbine section 18 includes a power turbine 60 having an output shaft, not shown, connected thereto for driving an accessory component, such as a generator. Another portion of the turbine section 18 includes a gas producer turbine 62 connected in driving relationship to the compressor section 16. The gas producer turbine 62 includes a turbine assembly 64 being rotationally positioned about the central axis 14. The turbine assembly 64 includes a disc 66 having a plurality of blades 68 attached therein in a conventional manner.

Figure 3:
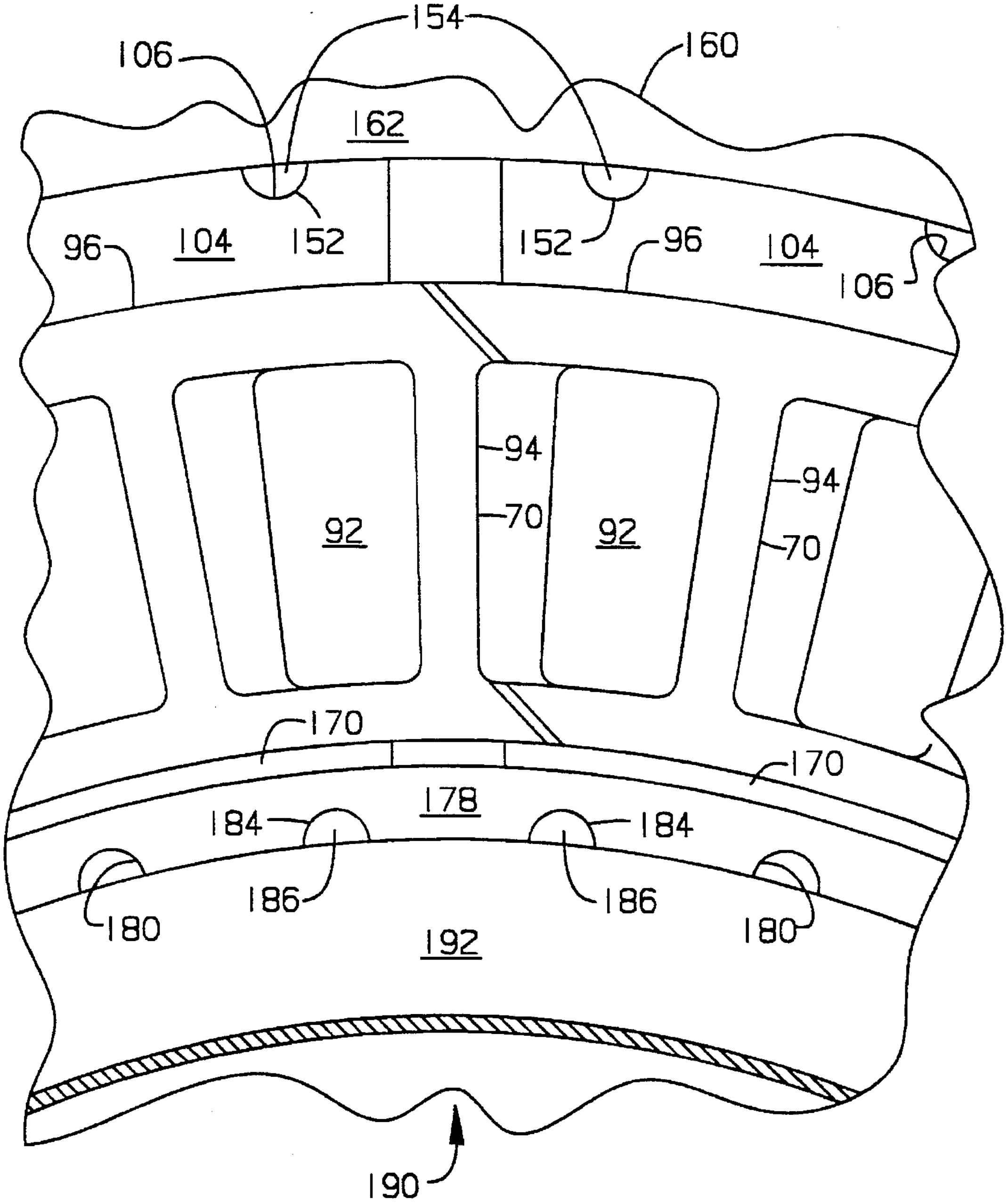
FIG. 3 is an enlarged pictorial partially sectional view of a portion of the gas turbine engine taken generally along lines 3—3 of FIG. 2.

Positioned adjacent the outlet end 42 of the combustor 32 and in flow receiving communication therewith is a nozzle guide vane assembly 70. The nozzle guide vane assembly 70 is made of a ceramic material having a relative low rate of thermal expansion as compared to the metallic components of the engine 10. As an alternative, the nozzle guide vane assembly 70 could be made of the same material and have the same rate of thermal expansion as the metallic components of the engine 10. The nozzle guide vane assembly 70 includes an outer shroud 72 defining a radial inner surface 74, a radial outer surface 76, a first end 78 being spaced from the outlet end 42 a predetermined distance and a second end 80. The nozzle guide vane assembly 70 further includes an inner shroud 82 defining a radial inner surface 84, a radial outer surface 86, a first end 88 being spaced from the outlet end 42 a predetermined distance and a second end 90. A plurality of vanes 92 are interposed the radial inner surface 74 of the outer shroud 72 and the radial outer surface 86 of the inner shroud 82. In this application, the outer shroud 72, the inner shroud 78 and the plurality of vanes 92 are fixedly connected one to another. Furthermore, as best shown in FIG. 3, the nozzle guide vane assembly 70 includes a plurality of segments 94 assembled together to form a ring shaped structure 96 centered about the central axis 14. As an alternative, the outer shroud 72 and/or the inner shroud 78 could be a single piece. Additionally, the plurality of vanes 92 could be cantilevered from either of the outer shroud 72 or the inner shroud 78.

A means 100 for attaching the plurality of segments 94 to the gas turbine engine is provided and includes the following components. Each of the plurality of segments 94 includes a pair of mounting legs 104 extending radially from the radial outer surface 76 of the outer shroud 72. Each of the legs 104 includes a pair of holes 106 being radially spaced about the central axis 14 and axially aligned with each other. A plurality of support members, not shown, could be interposed the pair of mounting legs 104. Each of the support members would be positioned in axial alignment with each of the pair of holes 106 and in turn would include a hole being in alignment with the pair of holes 106. The pair of holes 106 are positioned radially outward from the radial outer surface 76 of the outer shroud 72.

Axially spaced from the outer shroud 72 is a generally cylindrical tip shoe ring 108 defining a nozzle end 110, an inner surface 112 and an outer surface 114. The tip shoe ring 108, in this application, includes a plurality of segments but as an alternative could be a single ring. The inner surface 112 of the ring 108 is radially spaced from the blades 68 a preestablished distance forming a tip clearance 116. Each of the segments of the ring 108 further includes a pair of mounting members 118 extending radially outward from the outer surface 114. Each of the mounting members 118 includes a pair of holes 120 being radially spaced about the central axis 14 and axially aligned with corresponding holes 120 in each of the members 118. Corresponding ones of the pair of holes 106 in the pair of legs 104 and corresponding ones of the pair of holes 120 in the mounting members 118 are axially aligned.

A mounting bracket 130 extends radially inward from the outer housing 12 of the gas turbine engine 10 and is axially spaced away from the mounting member 118 nearest the turbine assembly 64. A plurality of bosses 132 are attached to the bracket 130, interposed the bracket 130 and the mounting member 118 and each of the plurality of bosses 132 have a bore 134 extending therethrough. Each of the bores 134 is radially spaced about the central axis 14 and axially aligned with a corresponding one of the pair of holes 106 in the pair of legs 104 and the pair of holes 120 in the mounting member 118. A support 136 extends radially inward from the outer housing 12 of the gas turbine engine 10 and is positioned between the one of the pair of legs 104 nearest to the turbine assembly 64 and the mounting member 118 nearest the outlet end 42 of the combustor 32. A plurality of bosses 138 are attached to the support 136 and are positioned between the support 136 and the mounting member 118 nearest the outlet end 42 of the combustor 32. A bore or hole 150 is radially spaced about the central axis 14 and extends through each of the plurality of bosses 138 and the support 136. Corresponding ones of the bores 150 are axially aligned with the pair of holes 106 in the pair of legs 104 and the pair of holes 120 in the mounting member 118. A pin 152 having a first end 154 and a second end 156 defines a predetermined length. The pin 152, in this application, is made of a ceramic material but, as an alternative, could be made of a metallic or any suitable material. The pin 152 is positioned in corresponding ones of the pair of holes 106 in the pair of legs 104, the bores 150 in the support 136 and the bosses 138, the pair of holes 120 in the mounting members 118 and the bores 134 in the bosses 132. The pins 152 align the segments 94 of the nozzle guide vane assembly 70 and the tip shoe ring 108 relative to the turbine blades 68 and the axis 14. A means 158 for retaining the pins 152 axially within the pair of holes 106 in the pair of legs 104, the bores 150 in the support 136 and the bosses 138, the pair of holes 120 in the mounting members 118 and the bores 134 in the bosses 132 is provided. In this application, the means 158 include the bracket 130 and a bracket 160 defining an "L" shaped configuration and having a leg extending radially along the one of the pair of legs 104 nearest the outlet end 42 of the combustor 32 and at least partially covering the first end 154 of the pins 152. The bracket 160 is attached to the gas turbine engine 10 in a conventional manner. As an alternative, the means 158 for retaining the pins 152 could include an interference fit, a snap ring design or a bore and pin design without changing the essence of the invention.

Each of the bracket 130, the support 136 and the bracket 160 include a corresponding plurality of holes 162 being radially positioned about the central axis 14 and being axially aligned. Axially connecting each of these plurality of holes 162 is a tie bolt 164 having threaded ends 166 and nuts 168 positioned thereon.

Each of the plurality of segments 94 have a pair of spaced apart mounting legs 170 extending radially from the radial inner surface 86 of the inner shroud 82. Each of the legs 170 includes a pair of holes 172 being radially spaced about the central axis 14 and axially aligned with each other. The pair of holes 172 are positioned radially inward from the radial inner surface 86 of the inner shroud 82. An inner support 174 is attached to the gas turbine engine 10 in a conventional manner and defines a radially extending clevis member 176 thereon. In this application, the inner support 174 is made of a low expansion metallic alloy. The clevis member 176 includes a pair of radially outward extending ears 178 positioned about the pair of mounting legs 170 of the inner shroud 82. A plurality of bores 180 are positioned in the ear 178 nearest the outlet end 42 of the combustor 32 and are radially spaced about the central axis 14 and axially aligned with corresponding ones of the pair of holes 172 in the legs 170 of the inner shroud 82. A plurality of bottoming bores 182 are positioned in the ear 178 nearest the turbine assembly 64 and are radially spaced about the central axis 14 and axially aligned with corresponding ones of the pair of holes 172 in the legs 170 of the inner shroud 82. Each of the plurality of bottoming bores 182 extend from the side of the leg 170 nearest the outlet end 42 of the combustor 32 and stops prior to exiting the side of the leg 170 nearest the turbine assembly 64. A pin 184 having a first end 186 and a second end 188 defining a preestablished length is positioned in each of the plurality of bores 180 in the ear 178 nearest the outlet end 42 of the combustor 32, the pair of holes 172 in each of the legs 170 and in the bottoming bores 182 in the ear 178 nearest the turbine assembly 64. The pins 184 align the segments 94 of the nozzle guide vane assembly 70 at a radially inward position and insure the proper relative position of the nozzle guide vane assembly 70 to the outlet end 42 of the combustor 32 and the turbine assembly 64. The pin 184, in this application, is made of a ceramic material but, as an alternative, could be made of a metallic or any suitable material. A means 190 for retaining the pins 184 axially within the plurality of bores 180 in the ear 178, the pair of holes 172 in each of the legs and the bottoming bores 182 in the ear 178 is provided. In this application, the means 190 include a bracket 192 positioned at the first end 186 of the pin 184 and at least covering a portion of the first end 186 of the pin 184. The bracket 192 is attached to the gas turbine engine 10 in a conventional manner. As an alternative, the means 190 for retaining the pins 184 could include an interference fit, a snap ring design or a bore and pin design without changing the essence of the invention.

Industrial Applicability

In use, the gas turbine engine 10 is started and allowed to warm up and is used in any suitable power application. As the demand for load or power is increased, the engine 10 output is increased by increasing the fuel and subsequent air resulting in the temperature within the engine 10 increases. In this application, the components used to make up the nozzle guide vane assembly 70, being of different materials and having different rates of thermal expansion, grow at different rates and the forces resulting therefrom and acting thereon must be structurally compensated for to increase life and efficiency of the gas turbine engine. The structural arrangement of the nozzle guide vane assembly 70 being made of a ceramic material requires that the nozzle guide vane assembly 70 be generally isolated from the convention materials to insure sufficient life of the components.

For example, the means 100 for attaching the nozzle guide vane assembly 70 to the gas turbine engine 10 positions the nozzle guide vane assembly 70 in direct contact and alignment with the hot gases from the combustor 42. The nozzle guide vane assembly 70 is suspended from the metallic components of the engine 10 by way of a plurality of pinned connections. For example, near the radial extremity of each of the plurality of segments 94, a pair of pins 152 are positioned through the pair of holes 106 in the pair of legs 104, the bores 150 in the support 136 and the bosses 138, the pair of holes 120 in the mounting members 118 and the bores 134 in the bosses 132. The second end 156 is positioned in the boss 132 and is restricted from axial movement toward the turbine assembly 64 by the bracket 130. The first end 154 is restricted from axial movement toward the outlet end 42 of the combustor 32 by the bracket 160. Thus, the pins 152 position each of the segments 94 radially about the central axis 14. The pins 152 further position the tip shoe ring 108 radially about the central axis 14 and the turbine assembly 64. The inner surface 112 of the tip shoe ring 108 and the blades 68 on the turbine assembly 64 form a preestablished tip clearance 116.

The bracket 130, the bracket 136 and the bracket 160 are axially retained by the tie bolt 164, the nuts 168 attached to each of the threaded ends 166. As the metallic brackets 130,136,160 and the metallic tie bolt 164 expand due to heat. The axially clearance between the metallic brackets 130, 136,160, and the ceramic components, the pair of mounting legs 104, the mounting members 118, and the plurality of bosses 132,138 is increased reducing the physical stress therebetween.

The pins 184 of the means 100 for attaching the nozzle guide vane assembly 70 to the gas turbine engine 10 further position the nozzle guide vane assembly 70 in direct contact and alignment with the hot gases from the combustor 42. For example, near the radial interior of each of the segments 94 a pair of the pins 184 are positioned through a pair of the plurality of bores 180 in the ear 178, the pair of holes 172 in each of the legs 170 and into the bottoming bores 182. The second end 188 of the pin 184 is positioned in the bottoming bore 182 and is restricted from axial movement toward the turbine assembly 64. The first end 186 of the pin 184 is restricted from axial movement toward the outlet end 42 of the combustor 32 by the bracket 192.

Thus, in view of the foregoing, it is readily apparent that the structure of the present invention results in the interface between the segmented nozzle vane guide assembly 70 and the components of the gas turbine engine 10 being pinned one to another. In actuality, the relative position of the pinned interface of the ceramic components to that of the metallic components becomes a loose fit as the temperature increases. The loose fit can accommodate or tolerate a small amount of engine 10 structure movement without placing a high load into the ceramic nozzle vane guide assembly 70. Furthermore, the cantilevered pinned connection allows the structural connection to move relatively freely. Thus, avoiding a ceramic nozzle guide vane assembly 70 connection to metallic engine 10 components which could result in a catastrophic failure.

Other aspects, objects and advantages of this invention can be obtained from a study of the drawings, the disclosure and the appended claims.

We claim:

1. A system for attaching a nozzle guide vane assembly to a gas turbine engine having a central axis, a combustor and a turbine assembly positioned therein, said system positioning the nozzle guide vane assembly in radially spaced relationship to the central axis and axially spaced relationship to the combustor and the turbine assembly, said system for attaching comprising:

a plurality of members being attached to the gas turbine engine, each of said plurality of members having a plurality of bores therein being radially spaced about the central axis;

an outer shroud defining an outer surface and having a pair of legs extending radially outwardly therefrom, each of said pair of legs having a pair of holes therein being axially aligned with the corresponding pair of holes in the other of the pair of legs and the bores in the plurality of members;

an inner shroud defining an inner surface and having a pair of mounting legs extending radially inwardly therefrom, each of said pair of mounting legs having a pair of holes therein being axially aligned with the corresponding pair of holes in the other of the pair of mounting legs and the bores in the plurality of members;

a plurality of pins being positioned in the plurality of bores, the pair of holes in the outer shroud and the pair of holes in the inner shroud; and means for retaining the pins from axial movement.

2. The system for attaching a nozzle guide vane assembly to a gas turbine engine of claim 1 wherein said nozzle guide vane assembly includes a plurality of segments.

3. The system for attaching a nozzle guide vane assembly to a gas turbine engine of claim 2 wherein said plurality of pins include a pair of pins axially aligning the pair of holes in the outer shroud and the bores in the plurality of members and a pair of pins axially aligning the pair of holes with corresponding ones of the bores.

4. The system for attaching a nozzle guide vane assembly to a gas turbine engine of claim 3 wherein said pair of pins further positions a tip shoe ring radially about the turbine assembly.

5. The system for attaching a nozzle guide vane assembly to a gas turbine engine of claim 4 wherein said turbine assembly includes a plurality of turbine blades attached to a disc and said radial positioning of the tip shoe ring about the turbine blades forms a tip clearance therebetween.

6. The system for attaching a nozzle guide vane assembly to a gas turbine engine of claim 4 wherein said tip shoe ring includes a plurality of segments.

7. The system for attaching a nozzle guide vane assembly to a gas turbine engine of claim 4 wherein said plurality of members further position the tip shoe ring in axial relationship to the turbine assembly.

8. The system for attaching a nozzle guide vane assembly to a gas turbine engine of claim 1 wherein said inner shroud has a pair of mounting legs extending radially inwardly therefrom and said plurality of members include an inner support defining a clevis member having a pair of ears extending radially therefrom and being positioned about the mounting legs.

9. The system for attaching a nozzle guide vane assembly to a gas turbine engine of claim 1 wherein said plurality of mounting members have a preestablished rate of thermal expansion and said nozzle guide vane assembly has a preestablished rate of thermal expansion being less than the preestablished rate of thermal expansion of the plurality of mounting members.

10. The system for attaching a nozzle guide vane assembly to a gas turbine engine of claim 1 wherein said plurality of mounting members have a preestablished rate of thermal expansion and said nozzle guide vane assembly has a preestablished rate of thermal expansion equal to a preestablished rate of thermal expansion of the plurality of mounting members.

11. The system for attaching a nozzle guide vane assembly to a gas turbine engine of claim 1 wherein said plurality of pins have a preestablished rate of thermal expansion being equal to that of a preestablished rate of thermal expansion of the plurality of mounting members.

12. The system for attaching a nozzle guide vane assembly to a gas turbine engine of claim 1 wherein said plurality of pins have a preestablished rate of thermal expansion being equal to that of a preestablished rate of thermal expansion of the nozzle guide vane assembly.

* * * * *